(12) United States Patent
Zhang et al.

(10) Patent No.: US 12,542,743 B2
(45) Date of Patent: Feb. 3, 2026

(54) METHOD FOR TRAFFIC CONGESTION CONTROL, COMPUTER-READABLE MEDIUM AND ELECTRONIC DEVICE

(71) Applicant: Beijing Youzhuju Network Technology Co., Ltd., Beijing (CN)

(72) Inventors: Zhiming Zhang, Beijing (CN); Lidong Jiang, Beijing (CN); Zhuo Jiang, Beijing (CN); Weibo Liao, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/930,819

(22) Filed: Oct. 29, 2024

(65) Prior Publication Data

US 2025/0055799 A1  Feb. 13, 2025

Related U.S. Application Data

(63) Continuation of application No. PCT/CN2023/085795, filed on Mar. 31, 2023.

(30) Foreign Application Priority Data

Apr. 29, 2022 (CN) .......................... 202210476371.1

(51) Int. Cl.
*H04L 47/19* (2022.01)
*H04L 41/0896* (2022.01)
*H04L 47/12* (2022.01)

(52) U.S. Cl.
CPC ........ *H04L 47/196* (2013.01); *H04L 41/0896* (2013.01); *H04L 47/12* (2013.01)

(58) Field of Classification Search
CPC ..... H04L 47/70; H04L 47/762; H04L 47/822; H04L 47/10; H04L 47/805;
(Continued)

(56) References Cited

U.S. PATENT DOCUMENTS 7,742,489 B2 * 6/2010 Chinn ...................... H04L 47/10
370/466
8,478,907 B1 * 7/2013 Aloni ..................... G06F 13/128
719/321

(Continued)

FOREIGN PATENT DOCUMENTS

CN   103036803 A   4/2013
CN   109756429 A   5/2019
(Continued)

OTHER PUBLICATIONS

International Search Report for PCT/CN2023/085795, mailed on Jul. 10, 2023, 5 pages.

(Continued)

*Primary Examiner* — Djenane M Bayard
(74) *Attorney, Agent, or Firm* — Astute IP Law Group (57) ABSTRACT

The disclosure relates to a method, an apparatus for traffic congestion control, a computer-readable medium, and an electronic device. The method includes: allocating a network card bandwidth to a virtual machine on a same physical machine, where the network interface of the virtual machine is used for transmitting traffic of first and second transmission protocols; for any virtual machine on the physical machine, dividing a total bandwidth of the virtual machine into a first bandwidth, a second bandwidth, and a buffer bandwidth, where the first bandwidth is used to transmit traffic of the first transmission protocol, and the second bandwidth is used to transmit traffic of the second transmission protocol; and reallocating a bandwidth of the first and second transmission protocols based on the actual (Continued)

bandwidth used by the first and second transmission protocols.

17 Claims, 3 Drawing Sheets

(58) Field of Classification Search
CPC ............. H04L 41/0896; H04L 47/2416; H04L 63/0428; H04L 63/0823; H04L 63/1408; H04L 65/61; H04L 12/66; H04L 47/745; H04L 12/403; H04L 47/12; H04L 47/2433; H04L 1/0005; H04L 1/0009; H04L 1/0017; H04L 1/007; H04L 12/10; H04L 12/4641; H04L 2001/0098; H04L 47/765; H04L 2001/125; H04L 47/15; H04L 1/0006; H04L 1/004; H04L 1/0042; H04L 1/0083; H04L 1/16; H04L 41/0895; H04L 47/20; H04L 47/76; H04L 5/1453; H04L 5/1469; H04L 41/122; H04L 43/0876; H04L 47/803; H04L 41/40; H04L 41/5025; H04L 47/2408; H04L 41/16; H04L 41/5019; H04L 47/825; H04L 41/0853; H04L 41/0893; H04L 41/12; H04L 43/0882; H04L 47/21; H04L 47/283; H04L 47/824; H04L 47/83; H04L 49/253; H04L 49/35; H04L 67/12; H04L 1/18; H04L 5/0064; H04L 67/1097; H04L 1/1874; H04L 67/306; H04L 1/1854; H04L 1/0076; H04L 69/163; H04L 1/0057; H04L 67/565; H04L 69/164; H04L 43/045; H04L 47/122; H04L 69/00; H04L 47/27; H04L 1/187; H04L 1/0045; H04L 1/1614; H04L 2001/0096; H04L 67/562; H04L 67/566; H04L 67/2876; H04L 69/10; H04L 69/161; H04L 67/56; H04L 49/90; H04L 65/65; H04L 65/752; H04L 65/756; H04L 67/561; H04L 69/04; H04L 69/18; H04L 47/193; H04L 1/1867; H04L 27/0014; H04L 47/11; H04L 5/0008; H04L 43/106; H04L 63/145; H04L 47/2441; H04L 43/0829; H04L 43/0864; H04L 47/32; H04L 43/16; H04L 41/5009; H04L 69/16; H04L 47/29; H04L 65/80; H04L 47/24; H04L 43/00; H04L 43/087; H04L 43/0894; H04L 47/17; H04L 47/39; H04L 63/029; H04L 9/0825; H04L 43/0852; H04L 45/38; H04L 63/20; H04L 41/0894; H04L 41/145; H04L 47/127; H04L 47/225; H04L 47/263; H04L 47/30; H04L 47/43; H04L 47/52; H04L 47/808; H04L 12/1827; H04L 41/509; H04L 47/323
See application file for complete search history.

(56) References Cited

U.S. PATENT DOCUMENTS

| | | | |
|---|---|---|---|
| 9,608,917 | B1 | 3/2017 | Anderson et al. |
| 2004/0165588 | A1* | 8/2004 | Pandya ............... H04L 63/0218 370/389 |
| 2014/0192639 | A1* | 7/2014 | Smirnov ................ H04L 69/16 370/230 |
| 2016/0080207 | A1 | 3/2016 | Prakash et al. |
| 2021/0367890 | A1* | 11/2021 | Krivenok ................ H04L 47/15 |
| 2023/0300081 | A1* | 9/2023 | Lee .......................... H04L 47/25 370/230.1 |

FOREIGN PATENT DOCUMENTS

| | | |
|---|---|---|
| CN | 110661654 A | 1/2020 |
| CN | 112436982 A | 3/2021 |
| CN | 111193653 B | 8/2021 |
| CN | 113726690 A | 11/2021 |
| CN | 113746744 A | 12/2021 |
| CN | 114039926 A | 2/2022 |
| CN | 114079638 A | 2/2022 |
| CN | 114884823 A | 8/2022 |

OTHER PUBLICATIONS

Office Action for Chinese Patent Application No. 202210476371.1, mailed on Sep. 7, 2023, 18 pages.

Extended European Search Report for European Patent Application No. 23794956.5, mailed on Jun. 20, 2025, 10 pages.

* cited by examiner

METHOD FOR TRAFFIC CONGESTION CONTROL, COMPUTER-READABLE MEDIUM AND ELECTRONIC DEVICE

CROSS-REFERENCE OF RELATED APPLICATIONS

This application is a continuation of International Patent Application No. PCT/CN2023/085795, filed on Mar. 31, 2023, which claims the priority of a Chinese patent application submitted on Apr. 29, 2022, with application No. 202210476371.1 and entitled "METHOD, APPARATUS FOR TRAFFIC CONGESTION CONTROL, COMPUTER-READABLE MEDIUM AND ELECTRONIC DEVICE". All contents of this application are incorporated in the present application by reference.

FIELD

The disclosure relates to the field of data transmission technology, specifically to a method for traffic congestion control, an apparatus for traffic congestion control, a computer-readable medium, an electronic device, a computer program, and a computer program product.

BACKGROUND

Cloud computing has developed over more than a decade and has become an essential component of the Internet. An increasing number of businesses are willing to deploy servers on public cloud platforms. Enterprises aim to utilize the cloud platform's powerful computing capabilities to complete a large amount of backend processing within the cloud platform and provide simple terminal services through the Internet. However, cloud computing platforms face a challenge. With the end of Moore's Law, the performance improvement of cloud computing servers' Central Processing Units (CPUs) has slowed, while network bandwidth growth far outpaces CPU processing performance increases. This discrepancy leads to an excessive use of CPUs for network communication. To accelerate business processing speeds, especially for big data processing, users expect as high a network bandwidth as possible with as low latency as possible. Consequently, a significant portion of computing resources purchased by users is wasted on network communication.

Remote Direct Memory Access (RDMA) technology effectively addresses this challenge faced by cloud platforms. This technology offloads network communication-related tasks to the network card, reducing computational overhead for users and lowering latency. The cost added by RDMA network cards to support this technology is significantly lower than the cost of wasted computing resources. Thus, RDMA gradually becomes standard for cloud computing platforms and big data processing businesses.

To save costs, running RDMA technology over Ethernet gave rise to the standard for RDMA over Converged Ethernet (RoCE). Based on the RoCE standard, RDMA technology can be deployed using Ethernet devices. However, as the RoCE standard is a protocol different from TCP/IP, a challenge arises regarding how RoCE traffic and TCP traffic (i.e., TCP/IP traffic) can coexist peacefully on the same physical network. Therefore, a method is urgently needed to control the bandwidth between RoCE traffic and TCP traffic.

SUMMARY

The Summary provides a brief introduction to the concepts that will be described in detail in the Detailed description. The Summary is not intended to identify key or essential features of the claimed technical solution nor is it intended to limit the scope of the claimed technical solution.

In a first aspect, the disclosure provides a method for a traffic congestion control. The method includes: allocating a network card bandwidth to a virtual machine on a same physical machine, wherein a network interface of the virtual machine is used for transmitting traffic of a first transmission protocol and traffic of a second transmission protocol, with the first transmission protocol and the second transmission protocol being different types of transmission protocols sharing a same physical network; for any virtual machine on the physical machine, dividing a total bandwidth of the virtual machine into a first bandwidth, a second bandwidth, and a buffer bandwidth, wherein the first bandwidth is used for transmitting the traffic of the first transmission protocol, and the second bandwidth is used for transmitting the traffic of the second transmission protocol; and reallocating a bandwidth of the first transmission protocol and a bandwidth of the second transmission protocol based on an actual bandwidth used by the first transmission protocol and an actual bandwidth used by the second transmission protocol.

In a second aspect, the disclosure provides an apparatus for traffic congestion control. The apparatus comprises a processing module configured for allocating network card bandwidth to a virtual machine on a same physical machine, wherein a network interface of the virtual machine is used for transmitting traffic of a first transmission protocol and traffic of a second transmission protocol, the first transmission protocol and the second transmission protocol being different types of transmission protocols sharing a same physical network; the processing module is further configured for, for any virtual machine on the physical machine, dividing a total bandwidth of the virtual machine into a first bandwidth, a second bandwidth, and a buffer bandwidth; the first bandwidth is used for transmitting the traffic of the first transmission protocol, and the second bandwidth is used for transmitting the traffic of the second transmission protocol; and an allocating module configured for reallocating a bandwidth of the first transmission protocol and a bandwidth of the second transmission protocol based on an actual bandwidth used by the first transmission protocol and an actual bandwidth used by the second transmission protocol.

In a third aspect, the disclosure provides a computer-readable medium storing a computer program that, when executed by a processing device, implements steps of the method of the first aspect above.

In a fourth aspect, the disclosure provides an electronic device including a storage device storing at least one computer program and at least one processing device for executing the at least one computer program stored in the storage device to implement steps of the method of the first aspect above.

In a fifth aspect, the disclosure provides a computer program containing program code executable by a processing device, when the processing device executes the computer program to implement the steps of the method of the first aspect above.

In a sixth aspect, the disclosure provides a computer program product comprising a computer program borne on a non-transitory computer-readable medium containing program code executable by a processing device; when the processing device executes the computer program, it implements the steps of the first aspect above.

Other features and advantages of the disclosure will be detailed in the Detailed description below.

BRIEF DESCRIPTION OF THE DRAWINGS

The above and other features, advantages, and aspects of the various embodiments disclosed herein will become more apparent with reference to the accompanying drawings and the following Detailed description. Throughout the drawings, the same or similar reference signs denote the same or similar elements. It should be understood that the drawings are illustrative and that elements and components are not necessarily drawn to scale. In the drawings.

REFERENCE SIGNS

120—Switch; 140—Cloud Computing Server; 20—Traffic Congestion Device; 201—Processing Module; 203—Allocating module; 600—Electronic Device; 601—Processing Device; 602—ROM; 603—RAM; 604—Bus; 605—I/O Interface; 606—Input Device; 607—Output Device; 608—Storage Device; 609—Communication Device.

DETAILED DESCRIPTION

The embodiments of the disclosure will be described in more detail with reference to the accompanying drawings. Although certain embodiments of the disclosure are shown in the drawings, it should be understood that the disclosure can be implemented in various forms and should not be construed as limited to embodiments set forth herein. On the contrary, these embodiments are provided for a more thorough and complete understanding of the disclosure. It should be understood that the drawings and embodiments of the disclosure are for illustrative purposes only and are not intended to limit the scope of the disclosure.

It should be understood that the various steps recorded in the embodiments of the method of the disclosure can be executed in a different order and/or in parallel. Furthermore, the embodiments of the method may include additional steps and/or omit some of the steps shown. The scope of the disclosure is not limited in this respect.

The term "comprising" and its derivatives as used here are open-ended, i.e., "including but not limited to." The term "based on" means "at least partially based on." It should be noted that the concepts of "first," "second," etc., mentioned in the disclosure are used only to distinguish between different devices, modules, or units, and are not intended to limit the order or mutual dependency of the functions performed by these devices, modules, or units.

It can be understood that before using the technical solutions disclosed in embodiments of the disclosure, users should be appropriately informed of the type, scope, and usage scenarios of the personal information involved in the disclosure and obtain the users' authorization according to relevant laws and regulations.

For example, in response to receiving a user's proactive request, prompt information is sent to the user to clearly indicate that the operation requested by the user will require access to and use of the user's personal information. Thus, this allows the user to independently choose, based on the prompt information, whether to provide personal information to the electronic devices, applications, servers, or storage media, etc., carrying out the technical solutions of the disclosure.

As an optional but non-limiting implementation, the method of sending prompt information in response to receiving a proactive request from the user can be a pop-up window, in which the prompt information can be presented in text form. Additionally, the pop-up window can contain selection controls for the user to choose "Agree" or "Disagree" to provide personal information to the electronic device.

It can be understood that the above notification and user authorization process is merely illustrative and does not limit the implementation of the disclosure, and other methods complying with relevant laws and regulations can also be applied to the implementation of the disclosure.

In the meantime, it can be understood that the data involved in this technical solution (including but not limited to the data itself, the acquisition or use of data) should comply with the requirements of relevant laws, regulations, and related provisions.

The "best effort" internet service adapted to the early development needs, prompting the widespread use of the internet in people's daily lives and further infiltrating various industries. However, as applications expanded, the quality of "best effort" services gradually revealed shortcomings. Some industrial production fields have high requirements for a network bandwidth, latency, jitter, etc. Therefore, research related to internet service quality has also received further attention.

Cloud computing services have become an important part of the internet. However, the CPU performance of cloud computing servers has been increasing slowly; the growth rate of network bandwidth far exceeds the growth rate of CPU processing performance. The network bandwidth resources configured for a single cloud computing server are much larger than computing resources, leading to an excessive use of CPUs for network communication. This, in turn, this results in a significant portion of the computing resources purchased by users being wasted on network communication.

RDMA technology effectively addresses the aforementioned issues. To ensure compatibility between RDMA technology and traditional Ethernet, Ethernet is the most widely used access standard on the internet and is prevalent in nearly all data centers. To save costs, running RDMA over Ethernet became necessary, and the RoCE standard has been proposed. The RoCE standard allows RDMA technology to seamlessly interface with Ethernet, reducing deployment resistance. However, the RoCE standard can only operate internally within data centers, and traditional TCP/IP protocols are still needed to provide external services.

With the RoCE standard, RDMA technology can be deployed using Ethernet devices. However, since the RoCE standard is a protocol different from TCP/IP, how to allocate a bandwidth between RoCE traffic and TCP traffic on the same physical network is an issue. In the multi-tenant scenario of cloud computing platforms, some special Quality of Service (QoS) mechanisms are needed to ensure both can run smoothly.

Virtual machines on cloud computing servers use the Linux operating system. The QoS mechanism of Linux kernel traffic control (TC) provides a framework for traffic processing through three objects: qdisc (queueing discipline), class, and filter. Classifiable qdiscs include algorithms such as CBQ, HTB, and PRIO.

CBQ stands for Class-Based Queueing. It implements a rich connection sharing class structure with the ability to shape the bandwidth and manage bandwidth priorities.

HTB stands for Hierarchy Token Bucket. It has a rich connection sharing class system that can guarantee the bandwidth for each transmission protocol class and also allows breaking through the bandwidth limit of its own class to occupy the bandwidth of other transmission protocols.

PRIO stands for Priority. It cannot limit the bandwidth but can effectively manage traffic priorities.

However, the TC framework in Linux is quite complex, involving many locks s, which results in poor performance. Using HTB qdisc on the network card to limit the rate of RoCE and TCP traffic cannot meet current needs. Moreover, RoCE traffic is very sensitive to packet loss, and directly using packet loss as a method of rate limitation severely affects the performance of the RoCE protocol.

Each interface on an Ethernet switch has 8 QoS queues. Traffic types can be identified by the Differentiated Services Code Point (DSCP) field in the IP protocol header of each packet. RoCE and non-RoCE traffic can be classified and then sent to different queues for rate limiting and scheduling.

For inbound traffic from the switch to the cloud computing server, the switch can identify RoCE and TCP traffic (i.e., TCP/IP traffic) and perform rate limiting and scheduling. However, the QoS queues on a switch are limited, and RoCE traffic from different virtual machines uses the same DSCP value, making it impossible to limit the rate and schedule the traffic of multiple virtual machines simultaneously.

For the virtual network of the cloud computing server, RoCE traffic and TCP traffic share the same physical network. The same network interface within a user's virtual machine can transmit both RDMA traffic and TCP traffic. Because RoCE traffic's reliable transmission and congestion control functions are all on the network card, it is necessary to limit the rate of RoCE and TCP traffic on the network card.

To address the aforementioned issues, the disclosure provides an example embodiment of a method for traffic congestion control. In this implementation, a network card bandwidth is allocated to a virtual machine on a single physical machine (such as a switch or a cloud computing server). The network interface of the virtual machine is used to transmit traffic for a first transmission protocol and a second transmission protocol, where the first and second transmission protocols are different types of protocols sharing the same physical network.

Figure 1:
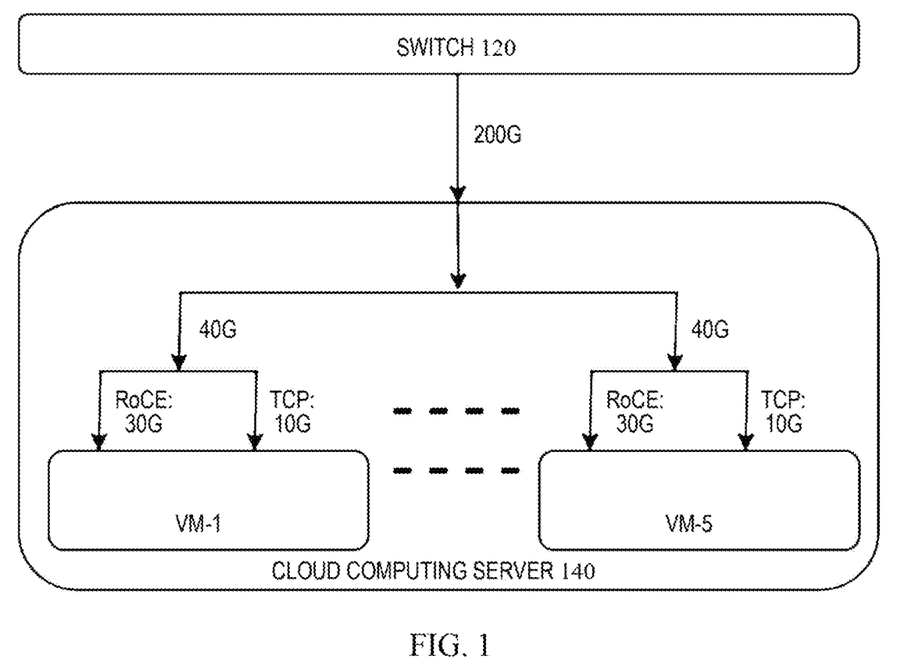
FIG. 1 is a schematic diagram of bandwidth allocation for virtual machines provided by an example embodiment of the disclosure.

For example, the first transmission protocol is RoCE, the second protocol is TCP/IP, and the network card is an RDMA card. As shown in FIG. 1, which provides a schematic diagram of the bandwidth allocation for virtual machines in an example embodiment of the disclosure.

As illustrated in FIG. 1, switch 120 and cloud computing server 140 are included. Suppose the network card bandwidth is 200 Gbps, and the cloud computing server 140 hosts 5 virtual machines (VMs), namely VM-1, VM-2, VM-3, VM-4, and VM-5, whose network interfaces transmit RoCE and TCP traffic. In one implementation, each virtual machine can be allocated with 40G of bandwidth. For inbound traffic from switch 120 to cloud computing server 140, the switch 120 can identify the traffic type of each packet by the DSCP field in the IP protocol header, classify RoCE and TCP traffic, and channel them to different meters on the RDMA card for rate limiting and scheduling.

It should be noted that the RDMA card supports the rte_flow interface of the Data Plane Development Kit (DPDK), with rules such as traffic classification, rate limiting, and scheduling via Meters, and performing rate limiting and scheduling for the traffic based on the values of registers. Therefore, by cascading meters and these rules, it is possible to achieve rate limiting and bandwidth borrowing functions for RoCE and TCP traffic.

Figure 2:
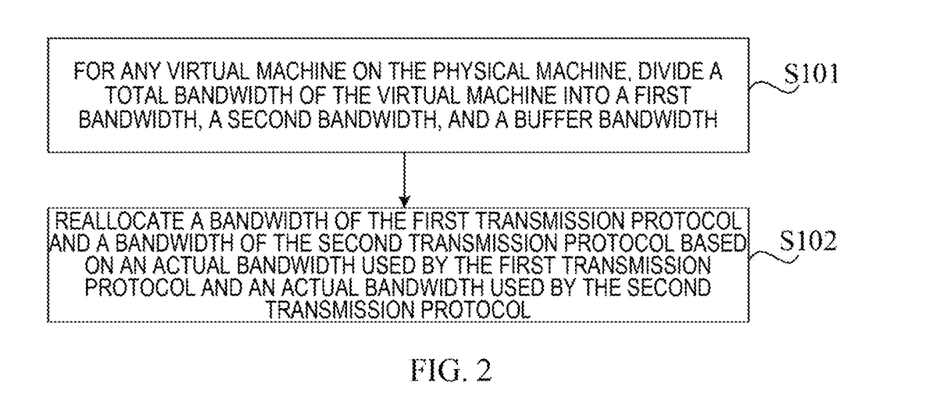
FIG. 2 is a flowchart of a method for traffic congestion control provided by an example embodiment of the disclosure.

Refer to FIG. 2, which provides a flowchart of the method for traffic congestion control provided in an example embodiment of the disclosure. The method is executed by an electronic device, such as the switch or cloud computing server shown in FIG. 1. The method for traffic congestion control illustrated in FIG. 2 includes the following steps.

In step S101, for any virtual machine on the physical machine, the total bandwidth of the virtual machine is divided into a first bandwidth, a second bandwidth, and a buffer bandwidth.

The first bandwidth is used for transmitting the first transmission protocol traffic, and the second bandwidth is used for transmitting the second transmission protocol traffic. Specifically, the first bandwidth is used for transmitting RoCE traffic, and the second bandwidth is used for transmitting TCP traffic.

Please continue to refer to FIG. 1, as previously stated, each virtual machine can be allocated with a total of 40G of bandwidth, with 30G and 10G bandwidth respectively allocated for RoCE and TCP traffic, and 5G as a buffer bandwidth to reduce the likelihood of RoCE and TCP traffic excessively competing for bandwidth. The value of the buffer bandwidth can also be adjusted according to the actual online operation conditions, and this is not limited here. For example, when the buffer bandwidth is 5G, if both RoCE and TCP are trying to send packets to their maximum capacity, RoCE traffic can reach 30G and TCP can reach 10G; if there is no TCP traffic, RoCE can borrow TCP's bandwidth, reaching a maximum of 35 Gbps (30+10−5).

In step S102, the bandwidth for the first and second transmission protocols is reallocated based on the actual bandwidth usage of the first transmission protocol and the second transmission protocol.

For instance, the bandwidth for the first and second transmission protocols can be reallocated via an RDMA card.

The RDMA card, located on the physical machine, can perform rate limiting and scheduling of any virtual machine on the physical machine. The RDMA card includes a classifier, a first register, a second register, a third register, a first meter, and a second meter. The classifier is used to identify the type of traffic passing through the network interface of the virtual machine, the first register records the type of traffic passing through the network interface of the virtual machine, and the first and second meters are used to perform rate limiting and scheduling of RoCE and TCP traffic, with the second and third registers used to record the results of the traffic control.

Figure 3:
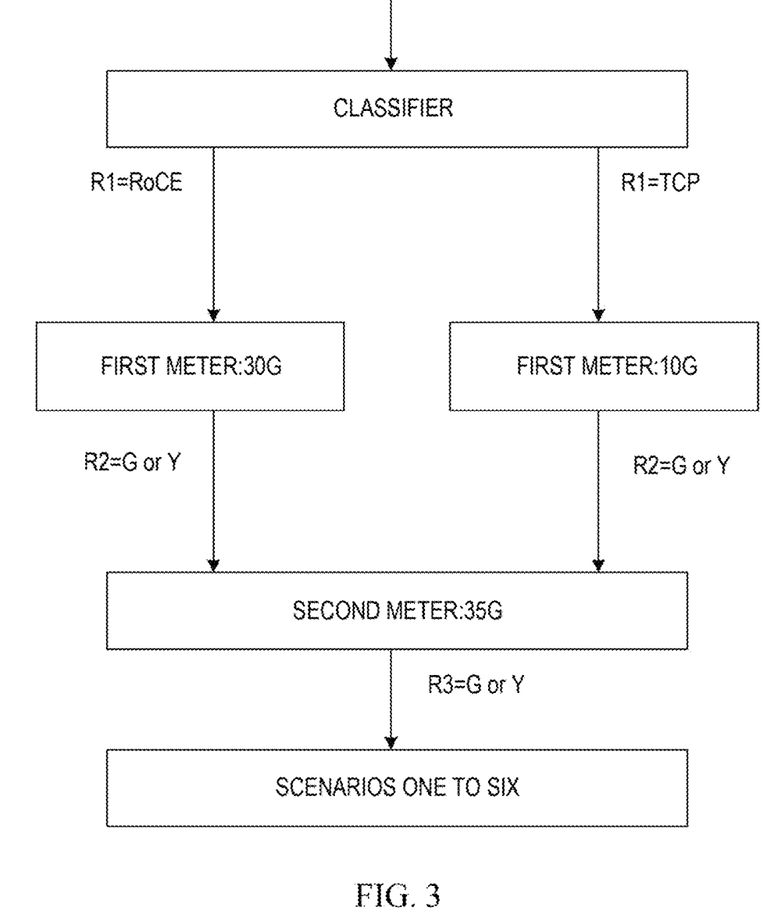
FIG. 3 is a flowchart of processing inbound traffic for a virtual machine provided by an example embodiment of the disclosure.

Please refer to FIG. 3, which gives a process flowchart for handling inbound traffic for a virtual machine in an example embodiment of the disclosure. For inbound traffic passing through the virtual machine's network interface, the traffic type is first identified by the classifier on the RDMA card—whether it is RoCE or TCP traffic—and then recorded by the first register R1; the first meter controls the traffic for RoCE and TCP for the first time, with the first meter potentially limiting RoCE traffic to a speed of 30G and controlling TCP traffic to a speed of 10G; the second register R2 stores the results of the first traffic control, with R2's value being G or Y, where G indicates that neither RoCE nor TCP traffic has reached the maximum limit of the first meter, while Y indicates that either RoCE or TCP traffic has reached the maximum limit of the first meter; the second meter controls the traffic for RoCE and TCP for the second time, for example, the combined traffic for RoCE and TCP may be limited to a speed of 35G. The third register R3 stores the result of the second traffic control by the second meter, with RYs value being G or Y, where G indicates that the combined traffic of RoCE and TCP has not reached the maximum speed of the second meter and Y indicates that the combined traffic of RoCE and TCP has reached the maximum speed of the second meter.

It should be clarified that there are several scenarios for reallocating the bandwidth of the first and second transmission protocols based on the actual bandwidth usage. For illustrative purposes, the bandwidth allocation scenarios are set as follows: the virtual machine is allocated a total bandwidth of 40G, the buffer bandwidth is set at 0, RoCE traffic is given a bandwidth of 30G, and TCP traffic is given a bandwidth of 10G.

Scenario one: in case there is remaining total bandwidth, the first transmission protocol or the second transmission protocol is controlled to occupy the remaining part of the total bandwidth.

When there is surplus total bandwidth, either RoCE or TCP traffic, or both, may have surplus bandwidth. In this situation, the protocol without surplus can borrow bandwidth from the one with surplus, that is, borrow the remaining part of the total bandwidth.

Scenario two: if the actual bandwidth used by the first transmission protocol is less than the first bandwidth and there is no surplus total bandwidth, the second transmission protocol is controlled to occupy a part of the first bandwidth.

For instance, if the actual usage of RoCE's bandwidth is less than 30G and there is no surplus in the total bandwidth of the virtual machine, this indicates that the bandwidth allocated to RoCE traffic is not fully used while the total bandwidth is exhausted, implying that the TCP traffic bandwidth is fully used, then a part of the bandwidth allocated to RoCE can be used by TCP traffic to prevent traffic congestion.

Scenario three: if the actual bandwidth used by the second transmission protocol is less than the second bandwidth and there is no surplus total bandwidth, the first transmission protocol is controlled to occupy a part of the second bandwidth.

For example, if the actual bandwidth usage of TCP traffic is less than 10G, while the total bandwidth of the virtual machine is already maxed out, it implies that RoCE's allocated bandwidth is exhausted, and RoCE traffic can be controlled to, therefore, use a part of TCP's bandwidth to prevent traffic congestion.

Scenario four: if the actual bandwidth used by the first transmission protocol equals the first bandwidth and there is no surplus total bandwidth, a congestion flag is set in the packets of the second transmission protocol to reduce the actual bandwidth used by the second transmission protocol.

For example, as the actual bandwidth used by RoCE traffic gradually increases and reaches 30G, and there is no remaining total bandwidth, it indicates that the actual bandwidth used by TCP traffic has also reached 10G. Since RoCE traffic is very sensitive to packet loss, and directly limiting its rate by dropping packets would seriously affect the performance of the RoCE protocol, a congestion flag is therefore set in TCP packets to reduce the actual bandwidth used by TCP traffic and prevent congestion.

The specific method to set congestion flags in TCP packets involves: an intermediate device (such as a switch) that receives TCP traffic packets detects network congestion, then sets a congestion flag in the packet, and after the receiver receives the packet with the congestion flag set, it sends a slow-down indication packet back to the sender. This slow-down indication packet is used to instruct the sender to reduce rate of sending data packets, to achieve the goal of reducing traffic.

Scenario five: if the actual bandwidth used by the second transmission protocol equals the second bandwidth and there is no remaining total bandwidth, the second transmission protocol is controlled to adopt a packet loss backoff mechanism to reduce the actual bandwidth used by both the first and second transmission protocols.

For example, as the actual bandwidth usage of TCP traffic gradually increases and reaches 10G without any remaining total bandwidth, it indicates that RoCE traffic has also exhausted its bandwidth of 30G. Since RoCE traffic is more sensitive to packet loss, directly limiting its rate by dropping packets would severely impact the performance of the RoCE protocol. Therefore, TCP traffic is controlled to use a packet loss backoff mechanism to reduce its actual bandwidth usage and prevent congestion.

The packet loss backoff mechanism means that the packets currently being transmitted (for the above example, this would be TCP packets) are discarded, and after a predetermined wait time, if there is detected surplus total bandwidth, the previously discarded packet is retransmitted.

Scenario six: if a sum of actual bandwidth used by the first transmission protocol and the second transmission protocol exceeds a predetermined threshold, both the first and second transmission protocols are controlled to adopt the packet loss backoff mechanism.

The predetermined threshold is higher than the total bandwidth, for example, it may be but not limited to 45G.

If the virtual machine is allocated with a total bandwidth of 40G, for instance, and the combined actual usage of bandwidth by RoCE and TCP traffic has already reached 45G, the network is already under heavy load and highly congested. At such a moment, the current congestion status may be record by the third register, and the value of the third register is set to red. Upon detecting that the third register's value is red, the RDMA card controls both RoCE and TCP traffic to use the packet loss backoff mechanism to prevent congestion.

In conclusion, if the actual bandwidth used by RoCE traffic is less than 30G, TCP traffic can borrow RoCE's bandwidth; if the actual bandwidth used by TCP traffic does not reach 10G, RoCE traffic can borrow TCP's bandwidth; when both RoCE and TCP traffic compete for 40G of bandwidth, the available bandwidth can be controlled so that the two can achieve a balance of 30:10.

It should be noted that the method for traffic congestion control provided by the disclosure can also be used for the outbound traffic of the virtual machine's network interface to perform traffic allocation and scheduling.

In summary, the method for traffic congestion control provided by the disclosure includes allocating a network card bandwidth to a virtual machine on a same physical machine, wherein a network interface of the virtual machine is used for transmitting traffic of a first transmission protocol and traffic of a second transmission protocol, with the first transmission protocol and the second transmission protocol being different types of transmission protocols sharing a same physical network; the first and second protocols being different types of transmission protocols sharing the same physical network; for any virtual machine on the physical machine, dividing a total bandwidth of the virtual machine into a first bandwidth, a second bandwidth, and a buffer bandwidth, wherein the first bandwidth is used for transmitting the traffic of the first transmission protocol, and the second bandwidth is used for transmitting the traffic of the second transmission protocol; reallocating a bandwidth of the first transmission protocol and a bandwidth of the second transmission protocol based on an actual bandwidth used by the first transmission protocol and an actual bandwidth used by the second transmission protocol. This method effectively controls the bandwidth ratio between the first and second transmission protocols, allocates a certain percentage of buffer bandwidth to prevent traffic congestion and ensures the performance of different transmission protocols running on the same physical network.

Figure 4:
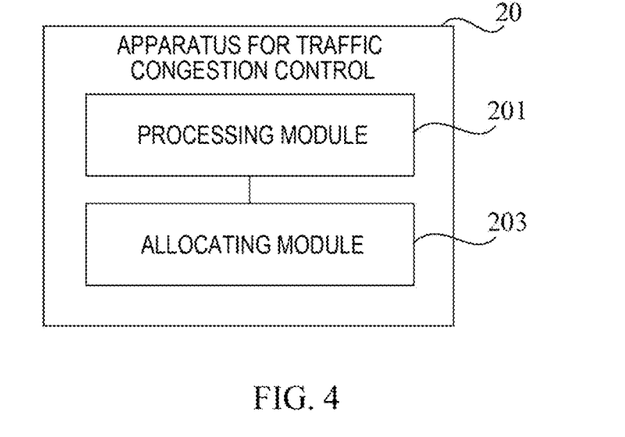
FIG. 4 is a block diagram of an apparatus for traffic congestion control provided by an example embodiment of the disclosure.

FIG. 4 is a block diagram of an apparatus for traffic congestion control provided in an example embodiment of the disclosure. Refer to FIG. 4, the device 20 includes a processing module 201 and an allocating module 203.

The processing module 201 is configured to allocate a network card bandwidth to a virtual machine on a same physical machine, wherein a network interface of the virtual machine is used for transmitting traffic of a first transmission protocol and traffic of a second transmission protocol, the first transmission protocol and the second transmission protocol being different types of transmission protocols sharing a same physical network.

The processing module 201 is further configured for, for any virtual machine on the physical machine, dividing the total bandwidth of the virtual machine into a first bandwidth, a second bandwidth, and a buffer bandwidth; the first bandwidth is used for transmitting the traffic of the first transmission protocol, and the second bandwidth is used for transmitting the traffic of the second transmission protocol.

The allocating module 203 is responsible for reallocating the bandwidth for the first and second transmission protocols based on the actual bandwidth used by the first and second transmission protocols.

Optionally, the allocating module 203 is further configured for reallocating the bandwidth of the first transmission protocol and the bandwidth of the second transmission protocol through a Remote Direct Memory Access, RDMA, network card.

Optionally, the mentioned RDMA card includes a classifier, a first register, a second register, a third register, a first meter, and a second meter. The processing module 201 is used to:

Identify a type of traffic passing through the network interface of the virtual machine via the classifier.

Record the type of traffic passing through the network interface of the virtual machine in the first register.

Control the traffic of the first transmission protocol and the second transmission protocol for the first time using the first meter.

Control the traffic of the first transmission protocol and the second transmission protocol for the second time using the second meter.

Store the result of the traffic control of the first time performed by the first meter in the second register.

Store the result of the traffic control of the second time performed by the second meter in the third register.

Optionally, the allocating module 203 further includes functionality for: in cases where there is remaining total bandwidth, controlling the first transmission protocol or the second transmission protocol to use the remaining part of the total bandwidth.

In a case where the actual bandwidth used by the first transmission protocol is less than the first bandwidth and there is no remaining total bandwidth, the second transmission protocol is controlled to occupy a part of the traffic of the first bandwidth.

In a case where the actual bandwidth used by the second transmission protocol is less than the second bandwidth and there is no remaining total bandwidth, the first transmission protocol is controlled to occupy a part of the traffic of the second bandwidth.

In a case where the actual bandwidth used by the first transmission protocol equals the first bandwidth and there is no remaining total bandwidth, a congestion flag is set in the packets of the second transmission protocol to reduce the actual bandwidth used by the second transmission protocol.

In a case where the actual bandwidth used by the second transmission protocol equals the second bandwidth and there is no remaining total bandwidth, the second transmission protocol is controlled to adopt a packet loss backoff mechanism to reduce the actual bandwidth used by both the first and second transmission protocols.

Optionally, the allocating module 203 is also used to, in a case where a sum of actual bandwidth used by the first and second transmission protocols exceeds a predetermined threshold, control both transmission protocols to adopt a packet loss backoff mechanism. This predetermined threshold is greater than the total bandwidth.

Optionally, the first transmission protocol is RoCE, and the second transmission protocol is TCP.

Optionally, the allocating module 203 is further used to control inbound and/or outbound traffic of the virtual machine through the RDMA card.

Figure 5:
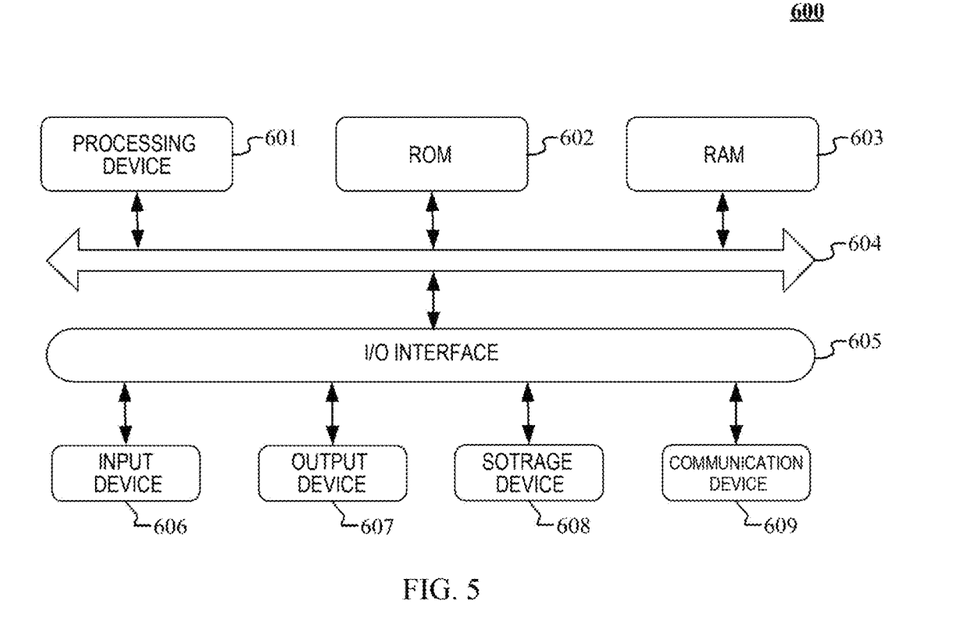
FIG. 5 is a structural schematic diagram of an electronic device provided by an example embodiment of the disclosure.

Referring to FIG. 5, it shows a schematic diagram of an electronic device (such as a switch or a cloud computing server depicted in FIG. 1) 600, suitable for implementing embodiments disclosed in this disclosure. The electronic device 600 as shown in FIG. 5 is just an example and should not impose any restrictions on the functionality and scope of use of the implementation examples of the disclosure.

As shown in FIG. 5, the electronic device 600 may include a processing device (such as a central processing unit, a graphics processing unit, etc.) 601, which can perform various appropriate actions and processing based on the program stored in Read-Only Memory (ROM) 602 or loaded from the storage device 608 into Random Access Memory (RAM) 603. Various programs and data required for the operation of the electronic device 600 are also stored in RAM 603. The processing device 601, ROM 602, and RAM 603 are interconnected through a bus 604. An Input/Output (I/O) interface 605 is also connected to the bus 604.

Typically, the following devices can be connected to the I/O interface 605: for example, an input devices 606 such as a touchscreen, a touchpad, a keyboard, a mouse, a camera, a microphone, an accelerometer, a gyroscopes, etc.; an output device 607 such as a Liquid Crystal Display (LCD), a speaker, a vibrator, etc.; a storage device 608 such as a tape drive, a hard drive, etc.; and a communication device 609. The communication device 609 may allow the electronic device 600 to communicate wirelessly or wired with other devices to exchange data. While FIG. 5 shows an electronic device 600 with various devices, it should be understood that the implementation is not required to have all the devices shown. More or fewer devices may be implemented as alternatives.

Specifically, according to embodiments of the disclosure, the processes described with reference to the flowcharts above can be implemented as a computer software program. For instance, embodiments of the disclosure include a computer program product comprising a computer program carried on a non-transitory computer-readable medium, which contains program code for executing the method shown in the flowchart. In such embodiments, the computer program can be downloaded and installed from the network via communication device 609, installed from storage device 608, or installed from ROM 602. When the computer program is executed by the processing device 601, it performs the functions specified in the method according to embodiments of the present disclosure.

It should be noted that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

The aforementioned computer-readable media can be contained within the electronic device mentioned above; they can also exist independently and not be assembled into the electronic device.

The aforementioned computer-readable media carry one or more programs, and when one or more of these programs are executed by the electronic device, they enable the electronic device to: allocate network card bandwidth to a virtual machine on a same physical machine, wherein a network interface of the virtual machine is used for transmitting traffic of a first transmission protocol and traffic of a second transmission protocol, with the first transmission protocol and the second transmission protocol being different types of transmission protocols sharing a same physical network; for any virtual machine on the physical machine, divide total bandwidth of the virtual machine into first bandwidth, second bandwidth, and buffer bandwidth, wherein the first bandwidth is used for transmitting the traffic of the first transmission protocol, and the second bandwidth is used for transmitting the traffic of the second transmission protocol; and reallocate the bandwidth of the first transmission protocol and the bandwidth of the second transmission protocol according to actual bandwidth used by the first transmission protocol and actual bandwidth used by the second transmission protocol.

Computer program code for carrying out operations of the present disclosure may be written in one or more program designing languages or a combination thereof, which include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules involved in the implementations of the disclosure can be implemented through software, as well as through hardware. Names of modules, in some instances, do not define the modules themselves.

The functions described above in this article can be at least partially executed by one or more hardware logic components. For example, non-limiting examples of hardware logic components that can be used include: Field Programmable Gate Arrays (FPGAs), Application Specific Integrated Circuits (ASICs), Application Specific Standard Products (ASSPs), On Chip Systems (SOC), Complex Programmable Logic Devices (CPLDs), and so on.

In the context of this disclosure, machine readable media can be tangible media that can contain or store programs for use by or in combination with instruction execution systems, devices, or devices. A machine readable media can be machine readable signal media or machine readable storage media. A machine readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

According to one or more embodiments of the disclosure, example 1 provides a method for traffic congestion control, including: allocating a network card bandwidth to a virtual machine on a same physical machine, wherein a network interface of the virtual machine is used for transmitting traffic of a first transmission protocol and traffic of a second transmission protocol, the first transmission protocol and the second transmission protocol being different types of transmission protocols sharing a same physical network;
  for any virtual machine on the physical machine, dividing a total bandwidth of the virtual machine into a first bandwidth, a second bandwidth, and a buffer bandwidth, wherein the first bandwidth is used for transmitting the traffic of the first transmission protocol, and the second bandwidth is used for transmitting the traffic of the second transmission protocol; and
  reallocating a bandwidth of the first transmission protocol and a bandwidth of the second transmission protocol based on an actual bandwidth used by the first transmission protocol and an actual bandwidth used by the second transmission protocol.

According to one or more embodiments of the disclosure, example 2 provides the method of example 1, where the reallocating a bandwidth of the first transmission protocol and a bandwidth of the second transmission protocol comprises:
  reallocating the bandwidth of the first transmission protocol and the bandwidth of the second transmission protocol through a Remote Direct Memory Access, RDMA, network card.

According to one or more embodiments of the disclosure, example 3 provides the method of example 2, where the RDMA network card comprises:
  a classifier through which a type of traffic passing through the network interface of the virtual machine is identified,
  a first register in which the type of traffic passing through the network interface of the virtual machine is recorded,
  a second register in which a result of the traffic control of the first time performed by the first meter is stored,
  a third register in which a result of the traffic control of the second time performed by the second meter is stored,
  a first meter through which the traffic of the first transmission protocol and the traffic of the second transmission protocol are controlled for a first time, and
  a second meter through which the traffic of the first transmission protocol and the traffic of the second transmission protocol are controlled for a second time.

According to one or more embodiments of the disclosure, example 4 provides the method of examples 1-3, where the reallocating a bandwidth of the first transmission protocol and a bandwidth of the second transmission protocol based on an actual bandwidth used by the first transmission protocol and an actual bandwidth used by the second transmission protocol comprises:
  if there is remaining total bandwidth, controlling the first transmission protocol or the second transmission protocol to occupy a remaining portion of the total bandwidth;
  if the actual bandwidth used by the first transmission protocol is less than the first bandwidth and there is no remaining total bandwidth, controlling the second transmission protocol to occupy a part of the traffic of the first bandwidth;
  if the actual bandwidth used by the second transmission protocol is less than the second bandwidth and there is no remaining total bandwidth, controlling the first transmission protocol to occupy a part of the traffic of the second bandwidth;
  if the actual bandwidth used by the first transmission protocol equals the first bandwidth and there is no remaining total bandwidth, setting a congestion flag in a data packet of the second transmission protocol to reduce the actual bandwidth used by the second transmission protocol; and
  if the actual bandwidth used by the second transmission protocol equals the second bandwidth and there is no remaining total bandwidth, controlling the second transmission protocol to adopt a packet drop backoff mechanism to reduce the actual bandwidth used by the first transmission protocol and the actual bandwidth used by the second transmission protocol.

According to one or more embodiments of the disclosure, example 5 provides the method of examples 1-4, where the reallocating a bandwidth of the first transmission protocol and a bandwidth of the second transmission protocol based on an actual bandwidth used by the first transmission protocol and an actual bandwidth used by the second transmission protocol further comprises:
  if a sum of the actual bandwidth used by the first transmission protocol and the actual bandwidth used by the second transmission protocol exceeds a predetermined threshold, controlling both the first and second transmission protocols to adopt a packet drop backoff mechanism, wherein the predetermined threshold is greater than the total bandwidth.

According to one or more embodiments of the disclosure, example 6 provides the method of examples 1-5, where the first transmission protocol is RoCE, and the second transmission protocol is TCP.

According to one or more embodiments of the disclosure, example 7 provides the method of examples 1-6, further comprising:
  controlling inbound traffic and/or outbound traffic of the virtual machine through an RDMA network card.

According to one or more embodiments of the disclosure, example 8 provides an apparatus for traffic congestion control including: a processing module configured for allocating a network card bandwidth to a virtual machine on a same physical machine, wherein a network interface of the virtual machine is used for transmitting traffic of a first transmission protocol and traffic of a second transmission protocol, the first transmission protocol and the second transmission protocol being different types of transmission protocols sharing a same physical network;
  wherein the processing module is further configured for, for any virtual machine on the physical machine, dividing a total bandwidth of the virtual machine into a first bandwidth, a second bandwidth, and a buffer bandwidth, wherein the first bandwidth is used for transmitting the traffic of the first transmission protocol, and the second bandwidth is used for transmitting the traffic of the second transmission protocol; and an allocating module configured for reallocating a bandwidth of the first transmission protocol and a bandwidth of the second transmission protocol based on an actual bandwidth used by the first transmission protocol and an actual bandwidth used by the second transmission protocol.

According to one or more embodiments of the disclosure, example 9 provides a computer-readable medium storing a computer program, which, when executed by a processing device, implements the steps of the aforementioned method for traffic congestion control.

According to one or more embodiments of the disclosure, example 10 provides an electronic device, including: a storage device that stores at least one computer program; and at least one processing device for executing the at least one computer program stored on the storage device to implement the steps of the aforementioned method for traffic congestion control.

According to one or more embodiments of the disclosure, example 11 provides a computer program containing program code executable by a processing device, which, when the processing device executes the computer program, implements the steps of the aforementioned method for traffic congestion control.

According to one or more embodiments of the disclosure, example 12 provides a computer program carried on a non-transitory computer readable medium, wherein the computer program contains program code executable by a processing device, when the processing device executes the computer program to implement the steps of the method for traffic congestion control.

The above description is only a preferred embodiment of this disclosure and an explanation of the technical principles used. Those skilled in the art should understand that the scope of disclosure involved in the present disclosure is not limited to technical solutions formed by specific combinations of the aforementioned technical features, but also covers other technical solutions formed by any combination of the aforementioned technical features or their equivalent features without departing from the disclosed concept. For example, a technical solution formed by replacing the above features with (but not limited to) technical features with similar functions disclosed in this disclosure.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure. Certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the subject matter of the disclosure has been described using language specific to structural features and/or methodological acts, it should be understood that the subject matter defined in the attached claims is not necessarily limited to the specific features or acts described above. Rather, the specific features and acts described above are disclosed as example forms of implementing the claims. As for the devices referred to in the above embodiments, the specific manner in which the various modules perform the operations has been described in detail in the embodiments of the method, and therefore will not be elaborated on here.

What is claimed is:

1. A method for traffic congestion control comprising:

allocating a network card bandwidth to a virtual machine on a same physical machine, wherein a network interface of the virtual machine is used for transmitting traffic of a first transmission protocol and traffic of a second transmission protocol, the first transmission protocol and the second transmission protocol being different types of transmission protocols sharing a same physical network;

for any virtual machine on the physical machine, dividing a total bandwidth of the virtual machine into a first bandwidth, a second bandwidth, and a buffer bandwidth, wherein the first bandwidth is used for transmitting the traffic of the first transmission protocol, and the second bandwidth is used for transmitting the traffic of the second transmission protocol; and reallocating a bandwidth of the first transmission protocol and a bandwidth of the second transmission protocol based on an actual bandwidth used by the first transmission protocol and an actual bandwidth used by the second transmission protocol, wherein the reallocating a bandwidth of the first transmission protocol and a bandwidth of the second transmission protocol based on an actual bandwidth used by the first transmission protocol and an actual bandwidth used by the second transmission protocol comprises:

if there is remaining total bandwidth, controlling the first transmission protocol or the second transmission protocol to occupy a remaining portion of the total bandwidth;

if the actual bandwidth used by the first transmission protocol is less than the first bandwidth and there is no remaining total bandwidth, controlling the second transmission protocol to occupy a part of the traffic of the first bandwidth;

if the actual bandwidth used by the second transmission protocol is less than the second bandwidth and there is no remaining total bandwidth, controlling the first transmission protocol to occupy a part of the traffic of the second bandwidth;

if the actual bandwidth used by the first transmission protocol equals the first bandwidth and there is no remaining total bandwidth, setting a congestion flag in a data packet of the second transmission protocol to reduce the actual bandwidth used by the second transmission protocol; and if the actual bandwidth used by the second transmission protocol equals the second bandwidth and there is no remaining total bandwidth, controlling the second transmission protocol to adopt a packet drop backoff mechanism to reduce the actual bandwidth used by the first transmission protocol and the actual bandwidth used by the second transmission protocol.

2. The method of claim 1, wherein the reallocating a bandwidth of the first transmission protocol and a bandwidth of the second transmission protocol comprises:

reallocating the bandwidth of the first transmission protocol and the bandwidth of the second transmission protocol through a Remote Direct Memory Access, RDMA, network card.

3. The method of claim 2, wherein the RDMA network card comprises:
a classifier through which a type of traffic passing through the network interface of the virtual machine is identified,
a first register in which the type of traffic passing through the network interface of the virtual machine is recorded,
a first meter through which the traffic of the first transmission protocol and the traffic of the second transmission protocol are controlled for a first time,
a second meter through which the traffic of the first transmission protocol and the traffic of the second transmission protocol are controlled for a second time,
a second register in which a result of the traffic control of the first time performed by the first meter is stored, and
a third register in which a result of the traffic control of the second time performed by the second meter is stored.

4. The method of claim 1, wherein the reallocating a bandwidth of the first transmission protocol and a bandwidth of the second transmission protocol based on an actual bandwidth used by the first transmission protocol and an actual bandwidth used by the second transmission protocol further comprises:
if a sum of the actual bandwidth used by the first transmission protocol and the actual bandwidth used by the second transmission protocol exceeds a predetermined threshold, controlling both the first and second transmission protocols to adopt a packet drop backoff mechanism, wherein the predetermined threshold is greater than the total bandwidth.

5. The method of claim 1, wherein the first transmission protocol is RoCE, and the second transmission protocol is TCP.

6. The method of claim 1, further comprising:
controlling inbound traffic and/or outbound traffic of the virtual machine through an RDMA network card.

7. An electronic device comprising:
a storage device, which stores at least one computer program thereon; and
at least one processing device, for executing the at least one computer program stored in the storage device, to implement steps of the method comprising:
allocating a network card bandwidth to a virtual machine on a same physical machine, wherein a network interface of the virtual machine is used for transmitting traffic of a first transmission protocol and traffic of a second transmission protocol, the first transmission protocol and the second transmission protocol being different types of transmission protocols sharing a same physical network;
for any virtual machine on the physical machine, dividing a total bandwidth of the virtual machine into a first bandwidth, a second bandwidth, and a buffer bandwidth, wherein the first bandwidth is used for transmitting the traffic of the first transmission protocol, and the second bandwidth is used for transmitting the traffic of the second transmission protocol; and
reallocating a bandwidth of the first transmission protocol and a bandwidth of the second transmission protocol based on an actual bandwidth used by the first transmission protocol and an actual bandwidth used by the second transmission protocol, wherein the reallocating a bandwidth of the first transmission protocol and a bandwidth of the second transmission protocol based on an actual bandwidth used by the first transmission protocol and an actual bandwidth used by the second transmission protocol comprises:
if there is remaining total bandwidth, controlling the first transmission protocol or the second transmission protocol to occupy a remaining portion of the total bandwidth;
if the actual bandwidth used by the first transmission protocol is less than the first bandwidth and there is no remaining total bandwidth, controlling the second transmission protocol to occupy a part of the traffic of the first bandwidth;
if the actual bandwidth used by the second transmission protocol is less than the second bandwidth and there is no remaining total bandwidth, controlling the first transmission protocol to occupy a part of the traffic of the second bandwidth;
if the actual bandwidth used by the first transmission protocol equals the first bandwidth and there is no remaining total bandwidth, setting a congestion flag in a data packet of the second transmission protocol to reduce the actual bandwidth used by the second transmission protocol; and
if the actual bandwidth used by the second transmission protocol equals the second bandwidth and there is no remaining total bandwidth, controlling the second transmission protocol to adopt a packet drop backoff mechanism to reduce the actual bandwidth used by the first transmission protocol and the actual bandwidth used by the second transmission protocol.

8. The electronic device of claim 7, wherein the reallocating a bandwidth of the first transmission protocol and a bandwidth of the second transmission protocol comprises:
reallocating the bandwidth of the first transmission protocol and the bandwidth of the second transmission protocol through a Remote Direct Memory Access, RDMA, network card.

9. The electronic device of claim 8, wherein the RDMA network card comprises:
a classifier through which a type of traffic passing through the network interface of the virtual machine is identified,
a first register in which the type of traffic passing through the network interface of the virtual machine is recorded,
a first meter through which the traffic of the first transmission protocol and the traffic of the second transmission protocol are controlled for a first time,
a second meter through which the traffic of the first transmission protocol and the traffic of the second transmission protocol are controlled for a second time,
a second register in which a result of the traffic control of the first time performed by the first meter is stored, and
a third register in which a result of the traffic control of the second time performed by the second meter is stored.

10. The electronic device of claim 7, wherein the reallocating a bandwidth of the first transmission protocol and a bandwidth of the second transmission protocol based on an actual bandwidth used by the first transmission protocol and an actual bandwidth used by the second transmission protocol further comprises:
if a sum of the actual bandwidth used by the first transmission protocol and the actual bandwidth used by the second transmission protocol exceeds a predetermined threshold, controlling both the first and second transmission protocols to adopt a packet drop backoff mechanism, wherein the predetermined threshold is greater than the total bandwidth.

11. The electronic device of claim 7, wherein the first transmission protocol is RoCE, and the second transmission protocol is TCP.

12. The electronic device of claim 7, further comprising:
controlling inbound traffic and/or outbound traffic of the virtual machine through an RDMA network card.

13. A non-transitory computer-readable medium storing a computer program, wherein, when executed by a processing device, the computer program implements steps of the method comprising:
allocating a network card bandwidth to a virtual machine on a same physical machine, wherein a network interface of the virtual machine is used for transmitting traffic of a first transmission protocol and traffic of a second transmission protocol, the first transmission protocol and the second transmission protocol being different types of transmission protocols sharing a same physical network;
for any virtual machine on the physical machine, dividing a total bandwidth of the virtual machine into a first bandwidth, a second bandwidth, and a buffer bandwidth, wherein the first bandwidth is used for transmitting the traffic of the first transmission protocol, and the second bandwidth is used for transmitting the traffic of the second transmission protocol; and
reallocating a bandwidth of the first transmission protocol and a bandwidth of the second transmission protocol based on an actual bandwidth used by the first transmission protocol and an actual bandwidth used by the second transmission protocol, wherein the reallocating a bandwidth of the first transmission protocol and a bandwidth of the second transmission protocol based on an actual bandwidth used by the first transmission protocol and an actual bandwidth used by the second transmission protocol comprises:
if there is remaining total bandwidth, controlling the first transmission protocol or the second transmission protocol to occupy a remaining portion of the total bandwidth;
if the actual bandwidth used by the first transmission protocol is less than the first bandwidth and there is no remaining total bandwidth, controlling the second transmission protocol to occupy a part of the traffic of the first bandwidth;
if the actual bandwidth used by the second transmission protocol is less than the second bandwidth and there is no remaining total bandwidth, controlling the first transmission protocol to occupy a part of the traffic of the second bandwidth;
if the actual bandwidth used by the first transmission protocol equals the first bandwidth and there is no remaining total bandwidth, setting a congestion flag in a data packet of the second transmission protocol to reduce the actual bandwidth used by the second transmission protocol; and
if the actual bandwidth used by the second transmission protocol equals the second bandwidth and there is no remaining total bandwidth, controlling the second transmission protocol to adopt a packet drop backoff mechanism to reduce the actual bandwidth used by the first transmission protocol and the actual bandwidth used by the second transmission protocol.

14. The non-transitory computer-readable medium of claim 13, wherein the reallocating a bandwidth of the first transmission protocol and a bandwidth of the second transmission protocol comprises:
reallocating the bandwidth of the first transmission protocol and the bandwidth of the second transmission protocol through a Remote Direct Memory Access, RDMA, network card.

15. The non-transitory computer-readable medium of claim 14, wherein the RDMA network card comprises:
a classifier through which a type of traffic passing through the network interface of the virtual machine is identified,
a first register in which the type of traffic passing through the network interface of the virtual machine is recorded,
a first meter through which the traffic of the first transmission protocol and the traffic of the second transmission protocol are controlled for a first time,
a second meter through which the traffic of the first transmission protocol and the traffic of the second transmission protocol are controlled for a second time,
a second register in which a result of the traffic control of the first time performed by the first meter is stored, and
a third register in which a result of the traffic control of the second time performed by the second meter is stored.

16. The non-transitory computer-readable medium of claim 13, wherein the reallocating a bandwidth of the first transmission protocol and a bandwidth of the second transmission protocol based on an actual bandwidth used by the first transmission protocol and an actual bandwidth used by the second transmission protocol further comprises:
if a sum of the actual bandwidth used by the first transmission protocol and the actual bandwidth used by the second transmission protocol exceeds a predetermined threshold, controlling both the first and second transmission protocols to adopt a packet drop backoff mechanism, wherein the predetermined threshold is greater than the total bandwidth.

17. The non-transitory computer-readable medium of claim 13, wherein the first transmission protocol is RoCE, and the second transmission protocol is TCP.

* * * * *